(12) United States Patent
Aronov

(10) Patent No.: US 10,110,036 B2
(45) Date of Patent: Oct. 23, 2018

(54) SUPERCAPACITOR-EMULATING FAST-CHARGING BATTERIES AND DEVICES

(71) Applicant: StoreDot Ltd., Herzeliya (IL)

(72) Inventor: Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 15/582,066

(22) Filed: Apr. 28, 2017

(65) Prior Publication Data

US 2018/0175634 A1 Jun. 21, 2018

Related U.S. Application Data

(60) Provisional application No. 62/434,432, filed on Dec. 15, 2016.

(51) Int. Cl.
*H01M 4/13* (2010.01)
*H01M 4/58* (2010.01)
(Continued)

(52) U.S. Cl.
CPC .............. *H02J 7/007* (2013.01); *H01M 4/366* (2013.01); *H01M 4/386* (2013.01); *H01M 4/387* (2013.01);
(Continued)

(58) Field of Classification Search
None
See application file for complete search history.

(56) References Cited

U.S. PATENT DOCUMENTS 3,778,254 A 12/1973 Cole et al.
6,541,156 B1 4/2003 Fuse et al.
(Continued)

FOREIGN PATENT DOCUMENTS

CA 2161076 4/1996
CA 2258026 12/1997
(Continued)

OTHER PUBLICATIONS

U.S. Appl. No. 62/371,874, filed Aug. 8, 2016, Burshtain.
(Continued)

*Primary Examiner* — Cynthia H Kelly
*Assistant Examiner* — Juilan Anthony
(74) *Attorney, Agent, or Firm* — Pearl Cohen Zedek Latzer Baratz LLP

(57) ABSTRACT

Methods and supercapacitor-emulating fast-charging batteries are provided. Methods comprise configuring a fast-charging battery to emulate a supercapacitor with given specifications by operating the fast-charging battery only within a partial operation range which is defined according to the given specifications of the supercapacitor and is smaller than 20%, possibly 5% or 1%, of a full operation range of the fast-charging battery. Devices are provided, which comprise control circuitry and a modified fast-charging lithium ion battery having Si, Ge and/or Sn-based anode active material and designed to operate at 5 C at least and within a range of 5% at most around a working point of between 60-80% lithiation of the Si, Ge and/or Sn-based anode active material, wherein the control circuitry is configured to maintain a state of charge (SOC) of the battery within the operation range around the working point.

6 Claims, 6 Drawing Sheets

(51) Int. Cl.
- H01M 2/00 (2006.01)
- H02J 7/00 (2006.01)
- H01M 10/0525 (2010.01)
- H01M 10/44 (2006.01)
- H01M 4/36 (2006.01)
- H01M 4/38 (2006.01)

(52) U.S. Cl.
CPC ....... *H01M 10/0525* (2013.01); *H01M 10/44* (2013.01)

(56) References Cited

U.S. PATENT DOCUMENTS

| | | |
|---|---|---|
| 6,599,662 B1 | 7/2003 | Chiang et al. |
| 7,192,673 B1 | 3/2007 | Ikeda et al. |
| 7,656,120 B2 | 2/2010 | Neu et al. |
| 7,906,238 B2 | 3/2011 | Le |
| 7,956,576 B2 | 6/2011 | Neu et al. |
| 8,021,791 B1 | 9/2011 | Plichta et al. |
| 8,945,774 B2 | 2/2015 | Coowar et al. |
| 8,951,673 B2 * | 2/2015 | Wessells ............ H01M 10/054 429/188 |
| 9,406,927 B1 | 8/2016 | Burshtain et al. |
| 9,472,804 B2 | 10/2016 | Burshtain et al. |
| 9,728,776 B2 | 8/2017 | Burshtain et al. |
| 2001/0017531 A1 | 8/2001 | Sakakibara et al. |
| 2002/0146623 A1 | 10/2002 | Suzuki et al. |
| 2003/0039889 A1 | 2/2003 | Park et al. |
| 2004/0033360 A1 | 2/2004 | Armand et al. |
| 2004/0219428 A1 | 11/2004 | Nagayama |
| 2005/0019659 A1 | 1/2005 | Shiozaki et al. |
| 2005/0093512 A1 * | 5/2005 | Mader ............... H01M 10/42 320/116 |
| 2007/0003837 A1 * | 1/2007 | Nishimura .......... H01M 4/0404 429/232 |
| 2007/0281216 A1 | 12/2007 | Petrat et al. |
| 2007/0284159 A1 | 12/2007 | Takami et al. |
| 2008/0093143 A1 | 4/2008 | Harrison |
| 2008/0248386 A1 * | 10/2008 | Obrovac ............ H01M 4/0435 429/209 |
| 2009/0179181 A1 | 7/2009 | Zhang et al. |
| 2010/0134065 A1 | 6/2010 | Iida |
| 2010/0134305 A1 | 6/2010 | Lu et al. |
| 2010/0159331 A1 | 6/2010 | Lee et al. |
| 2010/0190059 A1 | 7/2010 | Graetz et al. |
| 2011/0257001 A1 | 10/2011 | Negishi |
| 2011/0260689 A1 | 10/2011 | Kano |
| 2012/0045696 A1 | 2/2012 | Herle |
| 2012/0088155 A1 | 4/2012 | Yushin et al. |
| 2012/0164531 A1 | 6/2012 | Chen et al. |
| 2013/0040226 A1 | 2/2013 | Yamauchi et al. |
| 2013/0059174 A1 | 3/2013 | Zhamu |
| 2013/0224594 A1 | 8/2013 | Yushin et al. |
| 2013/0229153 A1 | 9/2013 | Sarkar et al. |
| 2013/0260285 A1 | 10/2013 | Yamauchi et al. |
| 2013/0266875 A1 | 10/2013 | Matsumoto et al. |
| 2014/0004426 A1 | 1/2014 | Kerlau et al. |
| 2014/0113202 A1 | 4/2014 | Sun et al. |
| 2014/0295267 A1 | 10/2014 | Wang |
| 2015/0017515 A1 | 1/2015 | Jeon et al. |
| 2015/0046110 A1 | 2/2015 | Joe et al. |
| 2015/0221977 A1 | 8/2015 | Hallac et al. |
| 2015/0367747 A1 * | 12/2015 | Decker ............... B60L 11/1862 320/136 |
| 2016/0036045 A1 | 2/2016 | Burshtain et al. |
| 2016/0064773 A1 | 3/2016 | Choi et al. |
| 2016/0104882 A1 * | 4/2016 | Yushin ................. H01M 4/386 429/218.1 |
| 2016/0264124 A1 | 9/2016 | Hotta |
| 2017/0012279 A1 | 1/2017 | Burshtain et al. |
| 2017/0294680 A1 | 10/2017 | Burshtain et al. |

FOREIGN PATENT DOCUMENTS

| | | |
|---|---|---|
| CN | 101734675 | 6/2010 |
| CN | 104577081 | 4/2015 |
| EP | 1999818 | 12/2008 |
| EP | 2889097 | 7/2015 |
| JP | 2002-056891 | 2/2002 |
| JP | 2006-216276 | 8/2006 |
| JP | 2007-323837 | 12/2007 |
| JP | 2008-053092 | 3/2008 |
| JP | 2012/131674 | 7/2012 |
| KR | 2012-121265 | 10/2012 |
| WO | WO 2013/040356 | 3/2013 |
| WO | WO 2014068036 | 5/2014 |
| WO | WO 2016/031082 | 3/2016 |

OTHER PUBLICATIONS

U.S. Appl. No. 62/401,635, filed Sep. 29, 2016, Kedem et al.
U.S. Appl. No. 62/421,290, filed Nov. 13, 2016, Burshtain.
U.S. Appl. No. 62/426,625, filed Nov. 28, 2016, Burshtain et al.
U.S. Appl. No. 62/319,341, filed Apr. 7, 2016, Burshtain.
U.S. Appl. No. 62/337,416, filed May 17, 2016, Burshtain.
U.S. Appl. No. 62/401,214, filed Sep. 22, 2016, Burshtain et al.
U.S. Appl. No. 15/414,655, filed Jan. 25, 2016, Jacob et al.
U.S. Appl. No. 62/427,856, filed Nov. 30, 2016, Burshtain et al.
U.S. Appl. No. 62/482,450, filed Apr. 6, 2017, Drach et al.
U.S. Appl. No. 15/678,143, filed Aug. 16, 2017, Aronov et al.
U.S. Appl. No. 15/447,784, filed Mar. 2, 2017, Burshtain et al.
U.S. Appl. No. 15/447,889, filed Mar. 2, 2017, Burshtain et al.
Chaudhuri et al. "Core/shell nanoparticles: classes, properties, synthesis mechanisms, characterization, and applications" Chemical Reviews, vol. 112, No. 4, pp. 2373-2433, 2012.
Wu et al. "Hydrogen Storage in Pillared Li-Dispersed Boron Carbide Nanotubes", J. Phys. Chem. C, 2008, vol. 112, No. 22, pp. 8458-8463.
Secrist "Compound Formation in the Systems Lithium-Carbon and Lithium-Boron", Journal of the American Ceramic Society, Oct. 1967, vol. 50, No. 10, pp. 520-523.
Suzuki et al. "Silicon nitride thin film electrode for lithium-ion batteries", Journal of Power Sources, 2013, vol. 231, pp. 186-189.
Konno et al. "Application of Si-C-O glass-like compounds as negative electrode materials for lithium hybrid capacitors", Journal of Power Sources, 2009, vol. 191, No. 2, pp. 623-627.
Hu et al. "Silicon/graphene based nanocomposite anode: large-scale production and stable high capacity for lithium ion batteries", Journal of Materials Chemistry A, 2014, vol. 2, No. 24, pp. 9118-9125.
Cui et al. "Carbon-Silicon Core-Shell Nanowires as High Capacity Electrode for Lithium Ion Batteries", Nano Letters, May 8, 2009, vol. 9, No. 9, pp. 3370-3374.
Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.
Hwang et al. "Mesoporous Ge/GeO2/Carbon Lithium-Ion Battery Anodes with High Capacity and High Reversibility", ACS Nano, Apr. 13, 2015, vol. 9, No. 5, pp. 5299-5309.
Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-148.
Barton et al. "The Reduction of Germanium Dioxide With Graphite at High Temperatures", Journal of the Less-Common Metals, 1970, vol. 22, pp. 11-17.
Nitta et al. "High-Capacity Anode Materials for Lithium-Ion Batteries: Choice of Elements and Structures for Active Particles", Particle Systems Characterization, 2014, vol. 31, pp. 317-336.
Chung et al. "Electronically conductive phospho-olivines as lithium storage electrodes", nature materials, Oct. 22, 2002, vol. 1, pp. 123-128.

(56) References Cited

OTHER PUBLICATIONS

Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.

Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.

Son et al. "Silicon carbide-free graphene growth on silicon for lithium-ion battery with high volumetric energy density", Nature Communications, Jun. 25, 2015, vol. 6, No. 7393, pp. 1-8.

Tow et al. "A Study of Highly Oriented Pyrolytic Graphite as a Model for the Graphite Anode in Li-Ion Batteries", Journal of the Electrochemical Society, 1999, vol. 146, No. 3, pp. 824-832.

Qi et al. "Threefold Increase in the Young's Modulus of Graphite Negative Electrode during Lithium Intercalation", Journal of The Electrochemical Society, 2010, vol. 157, No. 5, pp. A558-A566.

Qi et al. "Lithium Concentration Dependent Elastic Properties of Battery Electrode Materials from First Principles Calculations", Journal of The Electrochemical Society, 2014, vol. 161, No. 11, pp. F3010-F3018.

Wen et al. "Thermodynamic and Mass Transport Properties of "LiAl"", Solid-State Science and Technology, Dec. 1979, vol. 126, No, 12, pp. 2258-2266.

Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.

Sun et al. "Silicon/Wolfram Carbide@Graphene composite: enhancing conductivity and structure stability in amorphous-silicon for high lithium storage performance", Electrochimica Acta, Jun. 25, 2016, vol. 191, pp. 462-472.

Cho et al. "Zero-Strain Intercalation Cathode for Rechargeable Li-Ion Cell", Angewandte Chemie, 2001, vol. 40, No. 18, pp. 3367-3369.

Ngo et al. "Mass-scalable synthesis of 3D porous germanium-carbon composite particles as an ultra-high rate anode for lithium ion batteries", Energy & Environmental Science, 2015, vol. 8, pp. 3577-3588.

Billaud et al. "Synthesis and electrical resistivity of lithium-pyrographite intercalation compounds (stages I, II and III)", Materials Research Bulletin, Jul. 1979, vol. 14, No. 7, pp. 857-864.

Guriparti et al. "Review on recent progress of nanostructured anode materials for Li-ion batteries", Journal of Power Sources, 2014, vol. 257, pp. 421-443.

Scott et al. "Ultrathin Coatings on Nano-LiCoO2 for Li-Ion Vehicular Applications", Nano Letters, 2011, vol. 11, pp. 414-418.

Chen et al. "Conductive Rigid Skeleton Supported Silicon as High-Performance Li-Ion Battery Anodes", Nano Letters, 2012, vol. 12, pp. 4124-4130.

Kim et al. "Electrochemical properties of carbon-coated Si/B composite anode for lithium ion batteries", Journal of Power Sources, 2009, vol. 189, pp. 108-113.

Wang et al. "Boron-doped carbon nanotube-supported Pt nanoparticles with improved CO tolerance for methanol electro-oxidation", Phys. Chem. Chem. Phys., 2012, vol. 14, pp. 13910-13913.

Wang et al. "The dimensionality of Sn anodes in Li-ion batteries", materialstoday, Dec. 2012, vol. 15, No. 12, pp. 544-552.

Bhandavat et al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.

Bhandavat et al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.

Nowotny et al. "Investigations in the three systems: Molybdenum-Silicon-boron, tungsten-Silicon-boron and in which System: VS12-TaSi2", MB. Chem., 1956, vol. 88, No. 2, pp. 179-182.

Kasavajjula et al. "Nano- and bulk-silicon-based insertion anodes for lithium-ion secondary cells", Journal of Power Sources, 2007, Vo. 163, pp. 1003-1039.

Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.

Liu et al. "A pomegranate-inspired nanoscale design for large-volume-change lithium battery anodes", Nature Nanotechnology, Mar. 2014, vol. 9, pp. 187-192.

Tao et al. "Hollow core-shell structured Si/C nanocomposites as high-performance anode materials for lithium-ion batteries", Nanoscale, 2014, vol. 6, pp. 3138-3142.

Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.

Byeon "Multifunctional metal-polymer nanoagglomerates from singlepass aerosol self-assembly", Scientific Reports, Aug. 10, 2016, pp. 1-8.

Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.

Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.

Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.

Gay et al. "Performance Characteristics of Solid Lithium-Aluminium Alloy Electrodes", Journal of the Electrochemical Society, Nov. 1976, vol. 123, No. 11, pp. 1591-1596.

Li et al. "High-rate aluminium yolk-shell nanoparticle anode for Li-ion battery with long cycle life and ultrahigh capacity" Nature Communications, Aug. 5, 2015, pp. 1-7.

Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.

Molino et al. "Hydrophobic conducting polymer films from post deposition thiol exposure", Synthetic Metals 162, 2012, pp. 1464-1470.

Jankovski et al. "New boron based salts for lithium-ion batteries using conjugated ligands", Physical Chemistry Chemical Physics, May 19, 2016, vol. 18, pp. 16274-16280.

Aurbach et al. "A short review of failure mechanisms of lithium metal and lithiated graphite anodes in liquid electrolyte solutions", Solid State Ionics, 2002, vol. 148, pp. 405-416.

He et al. "Effect of solid electrolyte interface (SEI) film on cyclic performance of Li4Ti5O12 anodes for Li ion batteries", Journal of Power Sources, 2013, vol. 239, pp. 269-276.

He et al. "Gassing in Li4Ti5O12-based batteries and its remedy", Scientific Reports, Dec. 3, 2012, vol. 2, No. 913, pp. 1-9.

Scharner et al. "Evidence of Two-Phase Formation upon Lithium Insertion into the Li1.33Ti1.67O4 Spinel", Journal of the Electrochemical Society, 1999, vol. 146, No. 3, pp. 857-861.

Doughty et al. "A General Discussion of Li Ion Battery Safety", The Electrochemical Society Interface, 2012, pp. 37-44.

E. McRae and J.F. Mareche "Stage dependence of the electrical resistivity of graphite intercalation compounds" Journal of Physics C: Solid State Physics, vol. 18, No. 8 , Apr. 5, 1983, pp. 1627-1640, Lab. de Chimie du Solide Miner., Nancy Univ., Vandoeuvre, France.

Takatoshi Kasukabe et al. "Beads-Milling of Waste Si Sawdust into High-Performance Nanoflakes for Lithium-Ion Batteries" Sci Rep. 2017; 7: 42734. Published online Feb. 20, 2017.

Yongxin An et al. "Effects of VC-LiBOB binary additives on SEI formation in ionic liquid-organic composite electrolyte" RSC Advances, 2012, 2, Accepted Feb. 21, 2012, pp. 4097-4102.

Aaron M. Chockla "Tin-Seeded Silicon Nanowires for High Capacity Li-Ion Batteries" Department of Chemical Engineering, Texas

(56) References Cited

OTHER PUBLICATIONS

Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al."High performance silicon nanoparticle anode in fluoroethylene carbonate-based electrolyte for Li-ion batteriesw" Chem. Commun., 2012, 48, Accepted May 28, 2012, pp. 7268-7270.
Rosa Martel Danoary Tsirinomeny "Contribution to the Ultra-Fast Charging of Electric Vehicles: The Configurable Modular Multi-level Converter (CMMC)" Mots-clés de l'auteur: Ultra-fast; lithium-titanate; UFCEV; CMMC; Flex-EV. Mar. 4, 2016.
Xu et al. "Reversible Conversion of Conducting Polymer Films from Superhydrophobic to Superhydrophilic", Angewandte Chemie, 2005, vol. 44, pp. 6009-6012.
International Search Report and Written Opinion of PCT Application No. PCT/IL2017/050424, dated Jul. 13, 2017.
Office action of U.S. Appl. No. 15/480,888 dated Sep. 13, 2017.
Office action of U.S. Appl. No. 15/447,784 dated Oct. 19, 2017.
Office action of U.S. Appl. No. 15/414,655 dated Aug. 14, 2017.
Office action of U.S. Appl. No. 15/447,784 dated Jun. 22, 2017.
Office action of U.S. Appl. No. 15/447,889 dated Jul. 17, 2017.
Office action of U.S. Appl. No. 15/480,919 dated Jul. 5, 2017.
Office action of U.S. Appl. No. 15/414,655, dated May 9, 2017.
Office action of U.S. Appl. No. 15/287,292, dated Dec. 15, 2017.
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF} date Nov. 4, 2014).
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH} Printed Dec. 19, 2017).
U.S. Office Action for U.S. Appl. No. 15/447,784, dated Dec. 28, 2017.
U.S. Office Action for U.S. Appl. No. 15/844,689, dated Jan. 31, 2018.
U.S. Office Action for U.S. Appl. No. 15/853,885, dated Feb. 23, 2018.
M. Moreno et al. "Ionic Liquid Electrolytes for Safer Lithium Batteries" Journal of The Electrochemical Society, 164 (1) A6026-A6031 (2017), pp. 6026-6031.
Andrzej Lewandowski et al. "Ionic liquids as electrolytes for Li-ion batteries—An overview of electrochemical studies" Journal of Power Sources 194 (2009) pp. 601-609.
Marisa C. Buzzeo et al."Non-Haloaluminate Room-Temperature Ionic Liquids in Electrochemistry—A Review" ChemPhysChem 2004, 5, pp. 1106-1120.
U.S. Office Action for U.S. Appl. No. 15/783,586, dated Apr. 6, 2018.
European Search Report for Application EP17206661.5, dated Apr. 16, 2018.
U.S. Final Office Action for U.S. Appl. No. 15/447,889, dated May 24, 2018.

* cited by examiner

SUPERCAPACITOR-EMULATING FAST-CHARGING BATTERIES AND DEVICES

CROSS REFERENCE TO RELATED APPLICATIONS

This application claims the benefit of U.S. Provisional Application No. 62/434,432, filed Dec. 15, 2016, which is incorporated by reference in its entirety.

BACKGROUND OF THE INVENTION

1. Technical Field

The present invention relates to the field of energy storage devices, and more particularly, to an emulation of supercapacitors using fast-charging batteries.

2. Discussion of Related Art

Supercapacitors, also known as ultracapacitors, are capacitors with high capacitance which are used to provide electric energy bursts, i.e., short term high energy pulses. In these applications, supercapacitors are superior to batteries in their ability to deliver much more charge over a shorter time and in their ability to undergo many more charging and discharging cycles. The superior performance in these respects is due to the fact that the operation of supercapacitors is based on electrostatic energy storage while the operation of batteries is based on electrochemical redox reactions, which are generally slower and cause more electrode degradation over time. Supercapacitors are designed in various ways, such as double layer supercapacitors (e.g., electric double-layer capacitors (EDLC)), pseudocapacitors, hybrid capacitors etc.

There is a direct relation between the supercapacitor's physical size to the charge it can store and the energy it can deliver. Typical supercapacitors range from 0.001 Wh of stored energy for dimensions in the scale (order of magnitude) of 1 cm, weight of 1 gr and maximal current of 0.5-1 A (rated capacitance 1 F) to 4 Wh of stored energy for dimensions in the scale (order of magnitude) of 10 cm, weight of 500 gr and maximal current reaching 2000 A with continuous currents reaching 200 A (rated capacitance 3000 F). Larger supercapacitors are made of multiple supercapacitor units to store and deliver larger energy ratings.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a device comprising control circuitry and a modified fast-charging lithium ion battery having Si, Ge and/or Sn-based anode active material and designed to operate at 5 C at least and within an operation range of 5% at most around a working point of between 60-80% lithiation of the Si, Ge and/or Sn-based anode active material, wherein the control circuitry is configured to maintain a state of charge (SOC) of the battery within the operation range around the working point.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
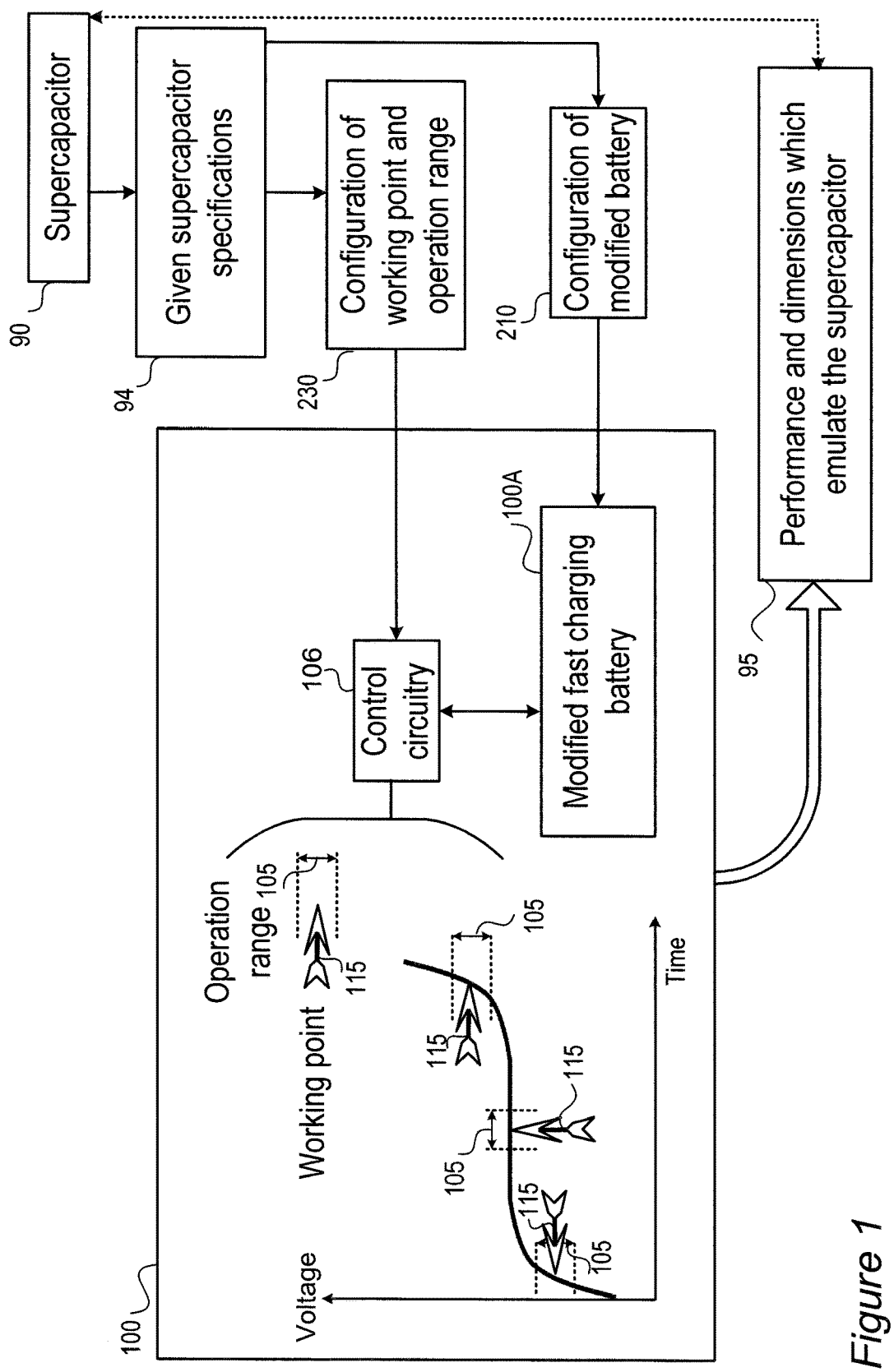
FIG. 1 is a high level schematic illustration of a device which emulates a supercapacitor using a modified fast-charging battery, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Methods and supercapacitor-emulating fast-charging batteries are provided. Methods comprise configuring a fast-charging battery to emulate a supercapacitor with given specifications by operating the fast-charging battery only within a partial operation range which is defined according to the given specifications of the supercapacitor and is smaller than 20%, possibly 5% or 1%, of a full operation range of the fast-charging battery. The full operation range may be defined as any of (i) 0-100% state of charge (SOC) of the battery, (ii) potential 0-100% state of charge (SOC) of the anode material from which the battery is prepared (in case there are mechanical structures that limit the lithiation of the anode active material, as discussed below), (iii) the nominal capacity of the battery, and/or equivalent definitions. Devices are provided, which comprise control circuitry and a modified fast-charging lithium ion battery having Si, Ge and/or Sn-based anode active material and designed to operate at 5 C at least and within a range of 5% at most around a working point of between 60-80% lithiation of the Si, Ge and/or Sn-based anode active material, wherein the control circuitry is configured to maintain the SOC of the battery within the operation range around the working point.

FIG. 1 is a high level schematic illustration of a device 100 which emulates a supercapacitor 90 using a modified fast-charging battery 100A, according to some embodiments of the invention. Device 100 may comprise modified fast-charging battery 100A configured to enable fast charging as explained below, and to operate within a narrow operation range 105 around a working point 115 as configured in configuration stages 210 disclosed below. Modified fast-charging battery 100A may be optimized to operate as part of device 100 and with respect to narrow operation range 105 and working point 115, as disclosed below.

Device 100 may further comprise a control unit 106 configured to operate modified fast-charging battery 100A within narrow operation range 105 around working point 115 to provide an output 95 which is equivalent to the output expected from corresponding supercapacitor 90 and/or according to given supercapacitor specifications 94, e.g., with respect to performance (e.g., currents, cycle life, capacity, etc.) and dimensions (e.g., size, weight) of corresponding supercapacitor 90. Device 100 may be designed to emulate any given supercapacitor 90 and/or any given supercapacitor specifications 94, as explained below. Different configurations of device 100 may be used to emulate corresponding different supercapacitors 90.

Control unit 106 may comprise various electronic components (e.g., diodes, switches, transistors, etc.) as circuit elements configured to determine working point 115 and prevent charging and/or discharging modified fast-charging battery 100A outside a specified voltage range corresponding to operating range 105. For example, control circuitry 106 may comprise circuit elements (e.g., diodes, switches, transistors, etc.) configured to prevent a charging current from reaching modified fast-charging battery 100A except in operation range 105 around working point 115.

Control circuit 106 may be configured to operate modified fast-charging battery 100A at narrow operation range 105 around working point 115, according to configuration parameters 230 such as the charging/discharging rate, dimension and other performance parameters of fast charging battery 100A determined with respect to the emulated supercapacitor 94, as disclosed below. In certain embodiments, the charging/discharging rate may be adjusted by selecting the working point at a specific SOC with respect to a given C-rate of the battery.

It is emphasized that the disclosed invention enables configuration of appropriate modified fast-charging battery 100A and/or device 100 for any given supercapacitor specifications, by configuring the dimensions of modified fast-charging battery 100A and the performance of modified fast-charging battery 100A and/or device 100 correspondingly.

The inventors have found that for any given supercapacitor specifications, corresponding modified fast-charging battery 100A and/or device 100 may indeed be designed to emulate the given supercapacitor. Examples for given supercapacitor specifications include, e.g., any of: (i) rated capacitance 1 F, stored energy 0.001 Wh, volume of ca. 1 cm$^3$, weight of 1 gr and maximal continuous current of 0.5-1 A (depending on conditions); (ii) rated capacitance 10 F, stored energy 0.01 Wh, volume of 3 cm$^2$, weight of 3-4 gr and maximal continuous current of 2-4 A (depending on conditions); (iii) rated capacitance 100 F, stored energy 0.1 Wh, volume of ca. 10 cm$^3$, weight of 20-25 gr and maximal continuous current of 5-15 A (depending on conditions); (iv) rated capacitance 300-600 F, stored energy 0.3-0.8 Wh, volume of ca. 20-30 cm$^3$, weight of 50-150 gr and maximal continuous current of 20-90 A (depending on conditions); (v) rated capacitance 1500 F, stored energy 1.5 Wh, volume of ca. 50-60 cm$^3$, weight of ca. 300 gr and maximal continuous current of 80-150 A (depending on conditions); (vi) rated capacitance 3000-4000 F, stored energy 3-4 Wh, volume of ca. 100 cm$^3$, weight of cal 500 gr and maximal continuous current of 130-200 A (depending on conditions); as well as larger supercapacitors and packs of supercapacitors, which may be emulated by modified fast-charging batteries 100A and/or devices 100, and/or packs thereof. The inventors have found that modified fast-charging battery 100A and/or device 100 may be configured to replace any of the examples of supercapacitors listed above, and provide equivalent or even superior performance with respect to the given supercapacitor specifications.

It is noted that modified fast-charging battery 100A and/or device 100 may be used in a variety of applications where a supercapacitor is used, to replace the supercapacitor by equivalent modified fast-charging battery 100A and/or device 100 with respect to performance, specifications and physical dimensions. For example, modified fast-charging battery 100A and/or device 100 may be configured to emulate large supercapacitors (see examples above) and be integrated as such into an electrical power grid (alone or in an array of such devices) to smoothen out spikes in energy demand. In another example, modified fast-charging battery 100A and/or device 100 may be configured to emulate small supercapacitors (see examples above) and be included in consumer electronic devices to ensure an even power supply for the device. In certain embodiments, modified fast-charging battery 100A and/or device 100 may be particularly advantageous with respect to the emulated supercapacitors in use cases which requires many short operation cycles, such as wireless sensors. As supercapacitors typically have a low energy density and high leakage currents, such scenarios typically exhaust supercapacitors quickly, while the much larger energy density and low leakage currents characterizing modified fast-charging battery 100A and/or device 100 may enable a much more extended operation of devices in such use cases.

Figure 2:
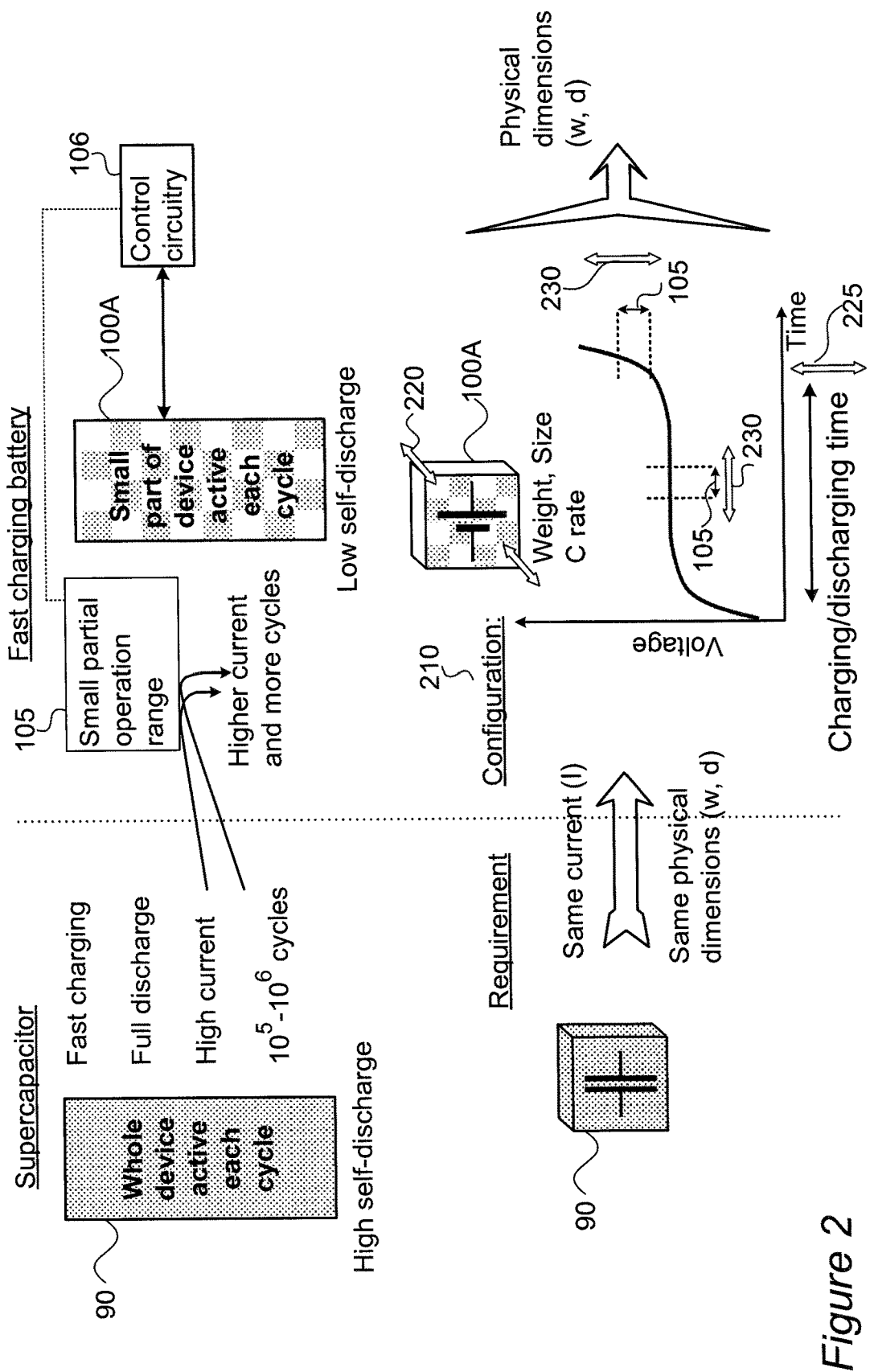
FIG. 2 is a high level schematic illustration of supercapacitor-emulating fast-charging battery and its configuration, according to some embodiments of the invention.
Figure 3:
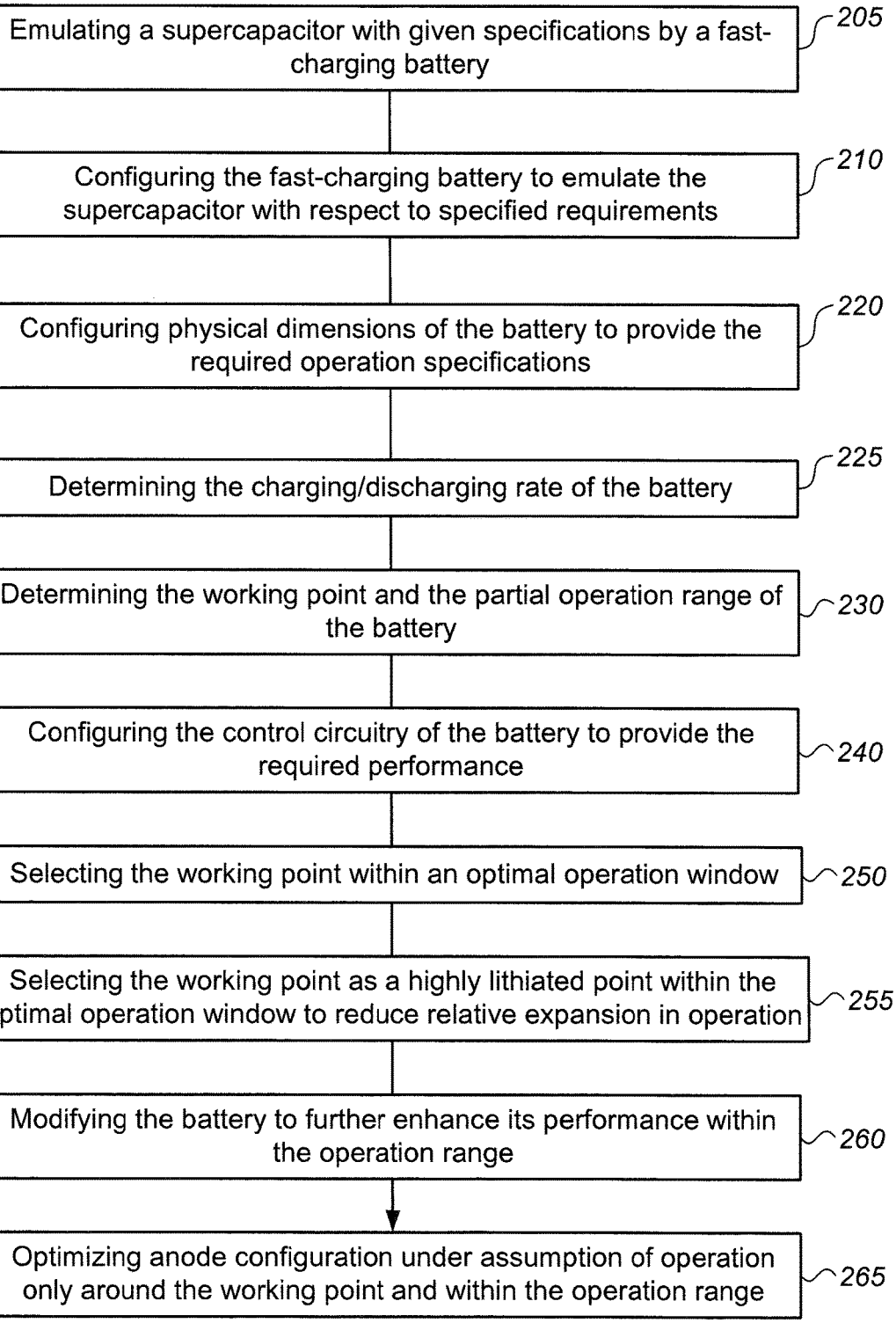
FIG. 3 is a high level schematic flowchart illustrating a method of emulating a supercapacitor by a fast-charging battery, according to some embodiments of the invention.
Figures 5A, 5B:
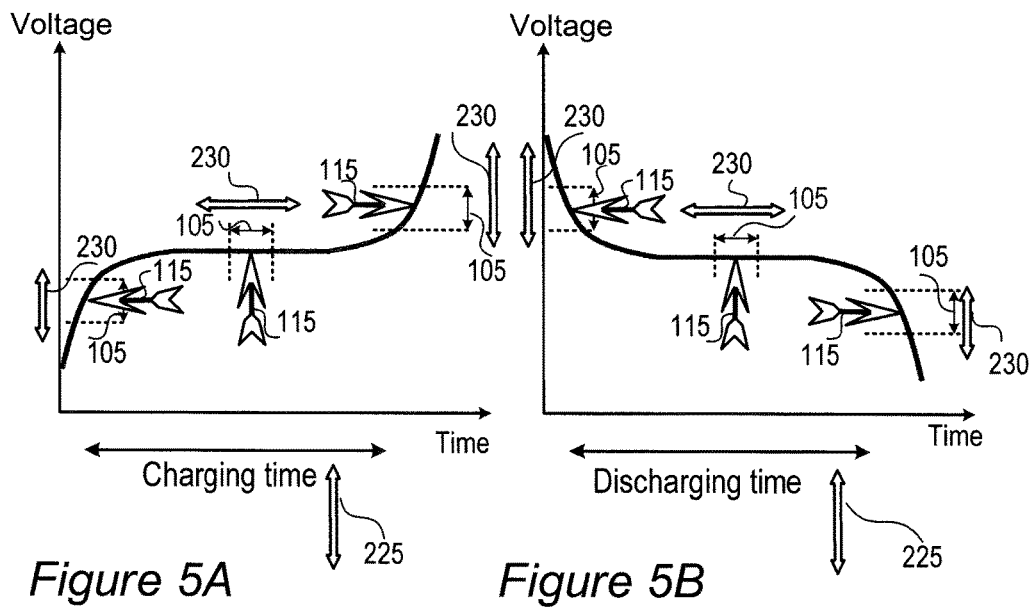
FIGS. 5A-5C are high level schematic illustrations relating to the selection of working point and narrow operation range, according to some embodiments of the invention.
Figure 5C:
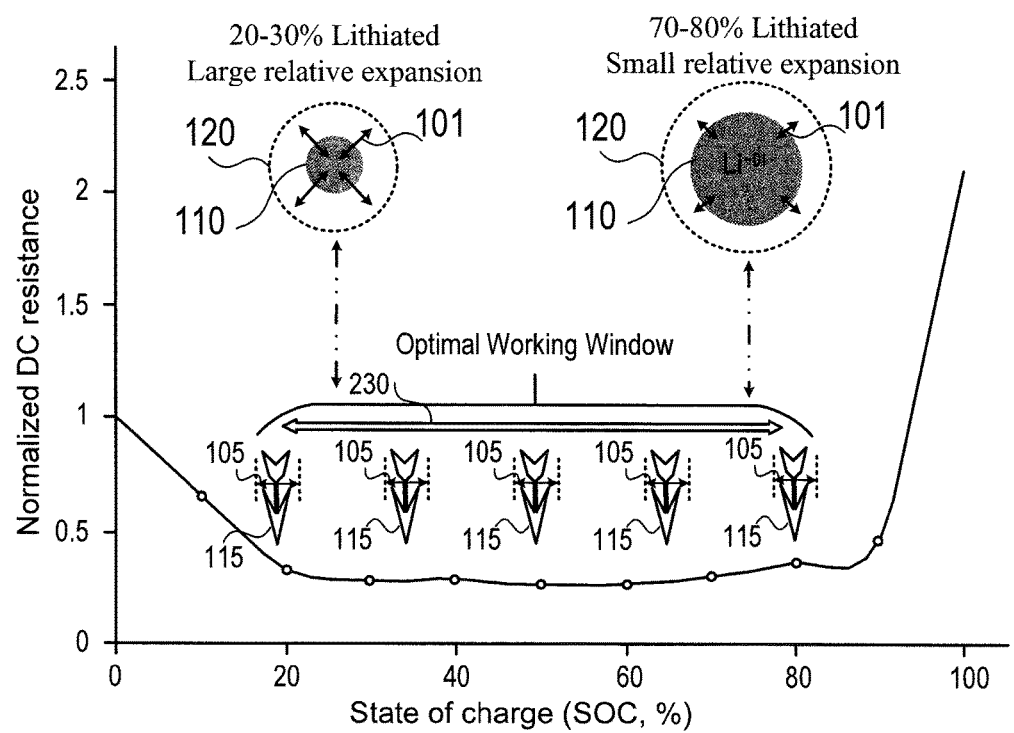

FIG. 2 is a high level schematic illustration of supercapacitor-emulating fast-charging battery 100A and its configuration, according to some embodiments of the invention. FIG. 3 is a high level schematic flowchart illustrating a method 200 of emulating a supercapacitor by a fast-charging battery, according to some embodiments of the invention. The method stages may be carried out with respect to battery 100. Method 200 may comprise stages for producing, preparing and/or using battery 100, irrespective of their order. FIGS. 5A-5C are high level schematic illustrations relating to the selection of working point 115 and narrow operation range 105, according to some embodiments of the invention. FIGS. 5A, 5B illustrate schematically charging and discharging graphs, respectively and FIG. 5C illustrates an example for an optimal working window for selecting working point 115, as explained below.

As illustrated schematically in FIG. 2, supercapacitors 90 are characterized by fast-charging rates typically having a charging time range of 2-20 sec (for the range of supercapacitors 90 presented in the Background of the Invention), full discharge in operation, high delivered currents (up to hundreds of amperes of continuous current per single supercapacitor unit) and operability over a large number of cycles ($10^5$-$10^6$ cycles). However, supercapacitors 90 typically suffer from relatively high self-discharge rates (leakage currents of about 1-3% of the maximal continuous current). Moreover, while the power density of supercapacitors 90 may be higher than the power density of lithium ion batteries, the energy density of lithium ion batteries is significantly larger (typically by several orders of magnitude) than the energy density of supercapacitors 90.

Charge and discharge rate are conventionally measured with respect to battery capacity. Thus, a charging rate of 1C means that a battery will reach nominal capacity in one hour of charging. Likewise, a 1 C discharge rate means that a battery will deplete fully in 1 hour. As used herein, "fast charge" refers to a charging rate of 5 C or greater.

Advantageously, fast-charging batteries (e.g., batteries configured to operate at a charge rate of at least about 5 C, and in embodiments at a rate of about 15 C to about 50 C and a discharge rate in embodiments of about 5 C) have low self-discharge rates (e.g., about 10% of the leakage current of a comparable supercapacitor), higher working potentials, shorter charging times and higher energy densities, which provide a significant advantage over supercapacitors 90. Fast charging lithium ion batteries that may be configured to emulate a supercapacitor according to the invention may be of any construction now known or hereafter developed, including those with metalloid-based anodes, as described in U.S. Pat. No. 9,472,804, which is incorporated by reference.

However, prior art fast-charging batteries typically provide lower currents (typically 1-10% of the continuous currents provided by a comparable supercapacitor) and operate for a smaller number of cycles (typically $10^3$ cycles) compared to supercapacitors 90, which typically provide higher currents and operate for a larger number of cycles (typically $10^5$-$10^6$ cycles).

Surprisingly, the inventors have figured out a way to emulate supercapacitors 90 by fast-charging batteries 100, thereby retaining the intrinsic advantages of fast-charging batteries while overcoming the prior art limitations and drawbacks of fast-charging batteries compared to supercapacitors 90.

Method 200 comprises configuring devices 100 and/or modified fast-charging battery 100A to emulate supercapacitor 90 with given specifications by operating the fast-charging battery only within a narrow partial operation range 105 around working point 115, which is defined according to the given specifications of supercapacitor 90 and is smaller than 20% of the full operation range of the fast-charging battery (see above). Partial operation range 105 may be determined according to the required performance and may be 20%, 10%, 5%, 1% or any other partial range of the full operation range of the lithium ion battery.

In certain embodiments, fast-charging battery 100A may be modified to be charged and discharged only over narrow operation range 105 around working point 115 or over a range including narrow operation range 105, but not over the full operation range of an unmodified fast-charging battery. For example, modified battery 100A may be designed to allow only small ranges of expansion of anode material particles 110 (see FIGS. 4A and 4B below and subsequent disclosure) and therefore not be operable as a regular lithium ion battery over a wide range of charging states.

Method 200 may be used to provide devices 100 and/or modified fast-charging batteries 100A which emulate a wide range of supercapacitors 90, at a corresponding wide range of operation specifications. Fast-charging batteries 100A may be configured to emulate corresponding supercapacitors 90 with respect to different performance requirements, such as a same continuous current requirement, a same weight requirement, a same dimensions requirement and so forth, adjusting the unrestricted parameters of fast-charging battery 100A to emulate specific supercapacitor 90 using only partial operation range 105 of fast-charging battery 100A to equal the performance of specific supercapacitor 90. In certain embodiments, fast-charging batteries 100A may be configured to emulate supercapacitors 90 within a performance envelope defined by the given specifications, possibly without having any specific identical parameters (such as current or dimension). The performance envelope may be defined in terms of one or more of the parameters listed below and/or in terms of any combination thereof. Embodiments of modifications of fast-charging batteries 100A and configurations of devices 100 and control circuitry 106 are disclosed below (see e.g., FIG. 4B).

Without being bound by theory, the inventors suggest that operating modified fast-charging batteries 100A over a partial operation range 105 enables larger continuous currents to be provided because only a small portion of the whole charging or discharging curve is utilized (see schematic illustration of a charging curve in FIG. 2) and increases the number of cycles as in each cycle different areas of battery 100A are actually operative (see schematic illustration by the checkering of battery 100A in FIG. 2) and therefore battery 100A in the disclosed operation mode can sustain a number of cycles which is, e.g., two to three orders of magnitudes larger than a typical battery operated over its full range—thereby bridging the gap to supercapacitors 90.

The following notation and units are used to denote the parameters of supercapacitors 90 (using the subscript SC for "supercapacitor", e.g., $E_{SC}$) and fast-charging batteries 100A (using the subscript FCB, e.g., $E_{P_{FCB}}$).

Energy parameters: The stored energy is denoted by E (Wh), and gravimetric and volumetric energy densities are denoted by $E_g$ (Wh/kg) and $E_v$ (Wh/l), respectively. The power density is denoted by P (W/kg).

Physical dimensions: The typical dimensions are characterized herein, in a non-limiting manner, by the unit's volume denoted by d ($cm^3$) and the weight is denoted by w (gr).

Performance parameters: The rated voltage is denoted by V (V), the maximal continuous current is denoted by I (A) and the charging time is denoted by t (1/C rate, e.g., for 50 C, t=1/50 in hours).

Operation parameter: Partial operation range 105 in which fast-charging battery 100A is operated to emulate a given supercapacitor 90 is denoted by SOC (state of charge, %), e.g., in case fast-charging battery 100A is operated only at 2% of the total charging/discharging range of fast-charging battery 100A, then SOC=2% (see examples below).

Equations 1 present the relations between these parameters, which are valid for both supercapacitors 90 and fast-charging batteries 100A.

$$E=E_g \cdot w=E_v \cdot d=V \cdot I \cdot t/3600 \text{ and } P=V \cdot I/w \quad \text{Equations 1}$$

Non-limiting examples for these parameters are presented above.

It is noted that, as expressed in Equations 1, the charging/discharging time in seconds may be defined as $t=E \cdot 3600/(V \cdot I)$.

In order to emulate given supercapacitor 90 by fast-charging battery 100A, first their physical dimensions (e.g., sizes or weight) and performance parameters may be brought into approximate conformation (illustrated in FIG. 2 as configuration 210), depending on the exact performance requirements. For example, if a given continuous current is required, the physical dimensions of fast-charging battery 100A and possibly the charging/discharging rate may be adjusted (illustrated in FIG. 2 by adjustments 220 and 225, respectively). In another example, if given dimensions are required (e.g., at least of a weight and a size dimension), the charging/discharging rate may be adjusted (illustrated in FIG. 2 by adjustment 225) and in both cases partial operation range 105 is adjusted (illustrated in FIG. 2 by adjustment 230) in order to provide the required performance.

For example, when given requirement $I_{FCB}=I_{SC}$, the equation $E=V \cdot I \cdot t/3600$ from Equations 1 may be used to calculate the required stored energy $E_{FCB}$ in fast-charging battery 100A and partial operation range 105 may be determined by the ratio between $E_{SC}/E_{FCB}$ to emulate supercapacitor 90 by fast-charging battery 100A. In some embodiments, energy storage $E_{FCB}$ may be traded off with respect to battery dimensions $d_{FCB}$, $w_{FCB}$ to adjust battery parameter.

In another example, when given requirement $w_{FCB}=w_{SC}$, the equation $E=VI/t$ from Equations 1 may be used to calculate the required current $I_{FCB}$ and/or charging time $t_{FCB}$ in fast-charging battery 100A and partial operation range 105 may be determined by the ratio between $E_{SC}/E_{FCB}$ to emulate supercapacitor 90 by fast-charging battery 100A.

Tables 1 and 2 provide examples of configurations of fast-charging battery 100A at two extremes of the range of parameter specifications of supercapacitors 90.

TABLE 1

Configuration of fast-charging battery at two extreme supercapacitor specifications, denoted as small and large supercapacitors 90, under condition of same stored energy.

|  | Small supercapacitor 90 | Fast-charging battery 100 A | Large supercapacitor 90 | Fast-charging battery 100 A |
|---|---|---|---|---|
| Stored energy | 0.001 Wh | | 3.04 Wh | |
| Gravimetric energy density | 0.9 Wh/kg | 0.9 Wh/kg | 6 Wh/kg | 11.8 Wh/kg |
| Volumetric energy density | 1.7 Wh/l | 3.6 Wh/l | 7.7 Wh/l | 43.4 Wh/l |
| Power | 2,400 W/kg | 2,500 W/kg | 12,000 W/kg | 8,500 W/kg |
| Rated voltage | 2.7 V | 3.35 V | 2.7 V | 3.35 V |
| Maximal continuous current | 0.7 A | 0.8 A | 210 A | 600 A |
| Dimensions | 12 mm · 8 mm | 0.4 mm · 6.25 cm² | 138 mm · 60.4 mm | 84 mm · 80 cm² |
| Volume | 0.6 cm³ | 0.3 cm3 | 395 cm³ | 70 cm³ |
| Weight | 1.1 g | 1.1 g | 510 g | 260 g |
| ESR* | 700 mOhm | | 0.29 mOhm | |
| Charging time** | 1.9 sec | 1.2 sec | 19.3 sec | 5 sec |

Table 1 illustrates, in non-limiting examples, the ability to emulate supercapacitors 90 at two extrema of their range of configurations by corresponding fast-charging batteries 100A, which achieve similar or even superior performance.

TABLE 2

Configuration of fast-charging batteries for different types of requirements, at two extreme supercapacitor specifications.

|  | Small supercapacitor | | Large supercapacitor | |
|---|---|---|---|---|
| Requirement: | Fixed current | Fixed weight | Fixed current | Fixed weight |
| Charging speed and % discharge | 50 C.@2% | 50 C.@1.7% | 50 C.@22% | 50 C.@3.6% |
| Stored energy | 0.046 Wh | 0.056 Wh | 13.86 Wh | 85.46 Wh |
| Gravimetric energy density | 50 Wh/kg | 50 Wh/kg | 170 Wh/kg | 170 Wh/kg |
| Volumetric energy density | 200 Wh/l | 200 Wh/l | 600 Wh/l | 600 Wh/l |
| Power | 2,500 W/kg | 2,500 W/kg | 8,500 W/kg | 8,500 W/kg |
| Rated voltage | 3.35 V | 3.35 V | 3.35 V | 3.35 V |

TABLE 2-continued

Configuration of fast-charging batteries for different types of
requirements, at two extreme supercapacitor specifications.

|  | Small supercapacitor | | Large supercapacitor | |
| --- | --- | --- | --- | --- |
| Requirement: | Fixed current | Fixed weight | Fixed current | Fixed weight |
| Maximal continuous current | 0.7 A | 0.8 A | 210 A | 1180 A |
| Dimensions | 3.6 mm · 0.55 cm², or 0.3 mm · 6.25 cm² | 5.4 mm · 0.55 cm², or 0.45 mm · 6.25 cm² |  | 84 mm · 160 cm² |
| Volume | 0.2 cm³ | 0.3 cm³ |  | 140 cm³ |
| Weight | 0.9 g | 1.1 g | 110 g | 510 g |
| ESR | ~100 mOhm | ~100 mOhm | ~0.5 mOhm | ~0.1 mOhm |

Table 2 illustrates, in non-limiting examples, the ability to emulate supercapacitors 90 at two extrema of their range of configurations and according to different specifications requirements, by corresponding fast-charging batteries 100A, which achieve similar or even superior performance.

Certain embodiments comprise control circuitry 106 of fast-charging battery 100A which is configured to provide the respective specified current and operate fast-charging battery 100A only within limited discharging range 105.

Method 200, as illustrated schematically in FIG. 3, may comprise emulating a supercapacitor with given specifications by a fast-charging battery (stage 205) by configuring the fast-charging battery to emulate the supercapacitor with respect to specified requirements (stage 210), for example by configuring physical dimensions of the battery to provide the required specifications (stage 220), determining charging/discharging rate of the battery (stage 225) and/or determining the working point and the partial operation range of the battery (stage 230). Method 200 may further comprise configuring the control circuitry of the battery to provide the required performance (stage 240).

Method 200 may further comprise selecting the working point within an optimal operation window (stage 250), possibly selecting the working point as a highly lithiated point within the optimal operation window to reduce relative expansion of the anode material particles during operation (stage 255).

Method 200 may further comprise modifying the battery to further enhance its performance within the operation range (stage 260), e.g., by optimizing the anode configuration under assumption of operation only around the working point and within the operation range (stage 265)—see e.g., FIG. 4B below.

Modified fast-charging batteries 100A may comprise improved anodes and cells, which enable fast charging rates with enhanced safety due to much reduced probability of metallization of lithium on the anode, preventing dendrite growth and related risks of fire or explosion. Anodes and/or electrolytes may have buffering zones for partly reducing and gradually introducing lithium ions into the anode for lithiation, to prevent lithium ion accumulation at the anode electrolyte interface and consequent metallization and dendrite growth. Various anode active materials and combinations, modifications through nanoparticles and a range of coatings which implement the improved anodes are provided. The electrolyte in the cell may be chosen to further reduce the accumulation rate of lithium ions at the interface, while maintaining the lithiation in the anode material is the rate limiting factor.

Figure 4A:
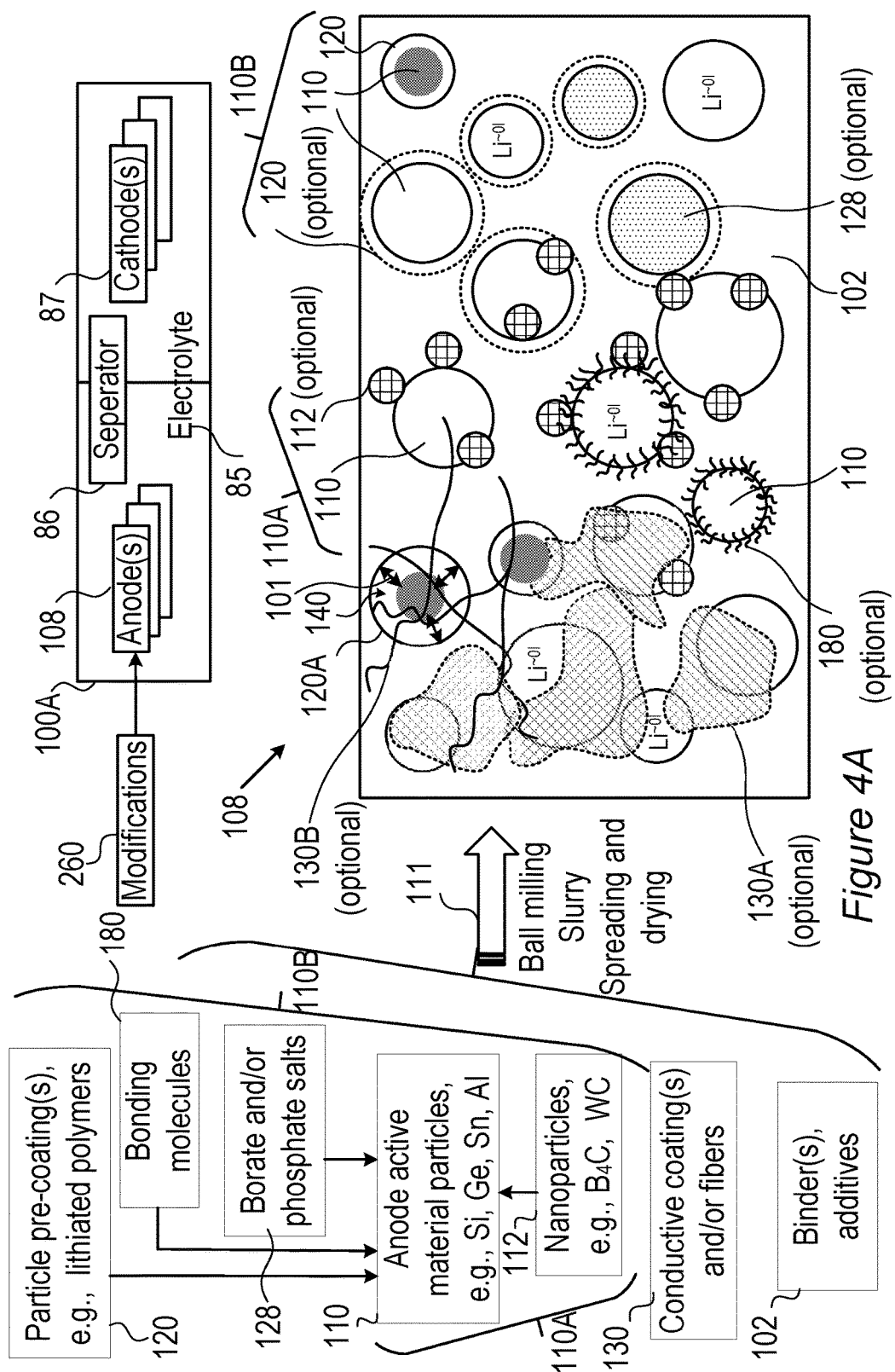
FIG. 4A is a high level schematic illustration of various anode configurations, according to some embodiments of the invention.

FIG. 4A is a high level schematic illustration of various anode configurations, according to some embodiments of the invention. FIG. 4A illustrates schematically, in a non-limiting manner, a surface of anode 108, which may comprise anode active material particles 110 (e.g., particles of metalloids such as silicon, germanium and/or tin, and/or of aluminum), and/or possibly composite core-shell particles 110B, at different sizes (e.g., in the order of magnitude of 100 nm, e.g., 100-500 nm, and/or possible in the order of magnitude of 10 nm or 1μ)—for receiving lithiated lithium during charging and releasing lithium ions during discharging. Anodes 108 may further comprise binder(s) and additive(s) 102 as well as optionally coatings 130 (e.g., conductive polymers 130A with or without lithium, conductive fibers 130B such as CNTs (carbon nanotubes) or carbon fibers). Active material particles 110 may be pre-coated by one or more coatings 120 (e.g., by conductive polymers, lithium polymers, etc.), have borate and/or phosphate salt(s) 128 bond to their surface (possibly forming e.g., $B_2O_3$, $P_2O_5$), bonding molecules 180 (illustrated schematically) which may interact with electrolyte 85 (and/or ionic liquid additives thereto) and/or various nanoparticles 112 (e.g., $B_4C$, WC, VC, TiN) (forming modified anode active material particles 110A), may be attached thereto in anode preparation processes 111 such as ball milling (see, e.g., U.S. Pat. No. 9,406,927, which is incorporated herein by reference in its entirety), slurry formation, spreading of the slurry and drying the spread slurry. For example, anode preparation processes 111 may comprise mixing additive(s) 102 such as e.g., binder(s) (e.g., polyvinylidene fluoride, PVDF, styrene butadiene rubber, SBR, or any other binder), plasticizer(s) and/or conductive filler(s) with a solvent such as water or organic solvent(s) (in which the anode materials have limited solubility) to make an anode slurry which is then dried, consolidated and is positioned in contact with a current collector (e.g., a metal, such as aluminum or copper). Details for some of these possible configurations are disclosed below.

In certain embodiments, modified fast-charging batteries 100A may be optimized for operation in device 100 by application of modifications 260 with respect to fast-charging batteries which are operated over their full (nominal) operation range. For example, battery 100A may be modified (260) to further enhance its performance within the operation range, e.g., by optimizing the anode configuration under assumption of operation only around the working point and within the operation range. For example, the anode material particles may be larger and/or more densely distributed in anodes 108 configured to operate only around the working point and within the operation range.

It is explicitly noted that in certain embodiments, cathodes may be prepared according to disclosed embodiments, and the use of the term anode is not limiting the scope of the invention. Any mention of the term anode may be replaced in some embodiments with the terms electrode and/or cathode, and corresponding cell elements may be provided in certain embodiments. For example, in cells 100A (of modified fast-charging batteries 100A, both designated by numerals 100A without limiting the scope of the invention to either) configured to provide both fast charging and fast discharging, one or both electrodes 108, 87 may be prepared according to embodiments of the disclosed invention.

Anode material particles 110, 110A, 110B, anodes 108 and cells 100A may be configured according to the disclosed principles to enable high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of the rate of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

In certain embodiments, anode 108 may comprise conductive fibers 130B which may extend throughout anode 108 (illustrated, in a non-limiting manner, only at a section of anode 108) interconnect cores 110 and interconnected among themselves. Electronic conductivity may be enhanced by any of the following: binder and additives 102, coatings 130A, conductive fibers 130B, nanoparticles 112 and pre-coatings 120, which may be in contact with electronic conductive material (e.g., fibers) 130.

Lithium ion cell 100A comprises anode(s) 108 (in any of its configurations disclosed herein) made of anode material with composite anode material such as any of anode material particles 110, 110A, 110B, electrolyte 85 and at least cathode 87 delivering lithium ions during charging through cell separator 86 to anode 108. Lithium ions ($Li^+$) are lithiated (to $Li^{-0l}$, indicating substantially non-charged lithium, in lithiation state) when penetrating the anode material, e.g., into anode active material cores 110 (possibly of core-shell particles 110B). Any of the configurations of composite anode material and core-shell particles 110B presented below may be used in anode 108, as particles 110B are illustrated in a generic, non-limiting way. In core-shell particle configurations 110B, the shell may be at least partly provided by coating(s) 120, and may be configured to provide a gap 140 for anode active material 110 to expand 101 upon lithiation. In some embodiments, gap 140 may be implemented by an elastic or plastic filling material and/or by the flexibility of coating(s) 120 which may extend as anode active material cores 110 expand and thereby effective provide room for expansion 101, indicated in FIG. 4A schematically, in a non-limiting manner as gap 140. Examples for both types of gaps 140 are provided below, and may be combined, e.g., by providing small gap 140 and enabling further place for expansion by the coating flexibility.

Examples for electrolyte 85 may comprise liquid electrolytes such as ethylene carbonate, diethyl carbonate, propylene carbonate, fluoroethylene carbonate (FEC), EMC (ethyl methyl carbonate), DMC (dimethyl carbonate), VC (vinylene carbonate) and combinations thereof and/or solid electrolytes such as polymeric electrolytes such as polyethylene oxide, fluorine-containing polymers and copolymers (e.g., polytetrafluoroethylene), and combinations thereof. Electrolyte 85 may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$, tris(trimethylsilyl)phosphite (TMSP) and combinations thereof. Ionic liquid(s) may be added to electrolyte 85 as disclosed below. Additive(s) (e.g., at few % wt) may comprise tris(trimethylsilyl)phosphite (TMSP), tris (trimethylsilyl) borate (TMSB), lithium difluoro(oxalato)borate (LiFOB), succinic anhydride, trimethyl phosphate (TMP) and triphenyl phosphate (TFP), fluorinated solvents (methyl nonafluorobutyl ether (MFE), and combinations thereof. Ionic liquid(s) may be added to electrolyte 85 as disclosed below.

In certain embodiments, cathode(s) 87 may comprise materials based on layered, spinel and/or olivine frameworks, and comprise various compositions, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP formulations (based on $LiFePO_4$), lithium rich cathodes, and/or combinations thereof. Separator(s) 86 may comprise various materials, such as polyethylene (PE), polypropylene (PP) or other appropriate materials. Possible compositions of anode(s) 100 are disclosed below in detail.

Examples for bonding molecules 180 may comprise e.g., lithium 3,5-dicarboxybenzenesulfonate, lithium sulfate, lithium phosphate, lithium phosphate monobasic, lithium trifluoromethanesulfonate, lithium 1,1,2,2,3,3,4,4,5,5,6,6,7,7,8,8,8-heptadecafluorooctane-1-sulfonate, lithium 2,6-dimethylbenzene-1,4-disulfonate, lithium 2,6-di-tert-butylbenzene-1,4-disulfonate, 3,3-((1,2-dithiane-4,5-diyl)bis(oxy)) bis(N-hydroxypropanamide), 3,3'-((4-mercapto-1,2-phenylene)bis(oxy))bis(N-hydroxypropanamide), lithium aniline sulfonate (the sulfonate may be in any of para, meta and ortho positions) as well as poly(lithium-4-styrenesulfonate), as well as related molecules derived therefrom by various substitutions and modifications, provided as some non-limiting examples.

In FIG. 4A, the different configurations are illustrated schematically in different regions of the anode surface, yet embodiments may comprise any combinations of these configurations as well as any extent of anode surface with any of the disclosed configurations. Anode(s) 108 may then be integrated in cells 100A which may be part of lithium ion batteries, together with corresponding cathode(s) 87, electrolyte 85 and separator 86, as well as other battery components (e.g., current collectors, electrolyte additives—see below, battery pouch, contacts, and so forth).

In certain embodiments, batteries 100A may be modified to comprise mechanical barriers configured to prevent full expansion of the anode material upon lithiation. For example, such mechanical barriers may be configured to enable 80% or less of the full expansion of the anode material upon lithiation. In certain embodiments, the anode material may comprise composite anode material particles 110B (see, e.g., FIGS. 4A, 4B) having shell structures which are smaller (provide a smaller expansion volume) than a full expansion volume of cores of the composite anode material particles. In certain embodiments, cathode(s) 87 of modified fast-charging lithium ion battery 100A may be designed to have a smaller capacity than anode(s) 108, as the cathodes are required to provide a smaller amount of lithium ions when battery 100A operates only within narrow operation range 105.

Figure 4B:
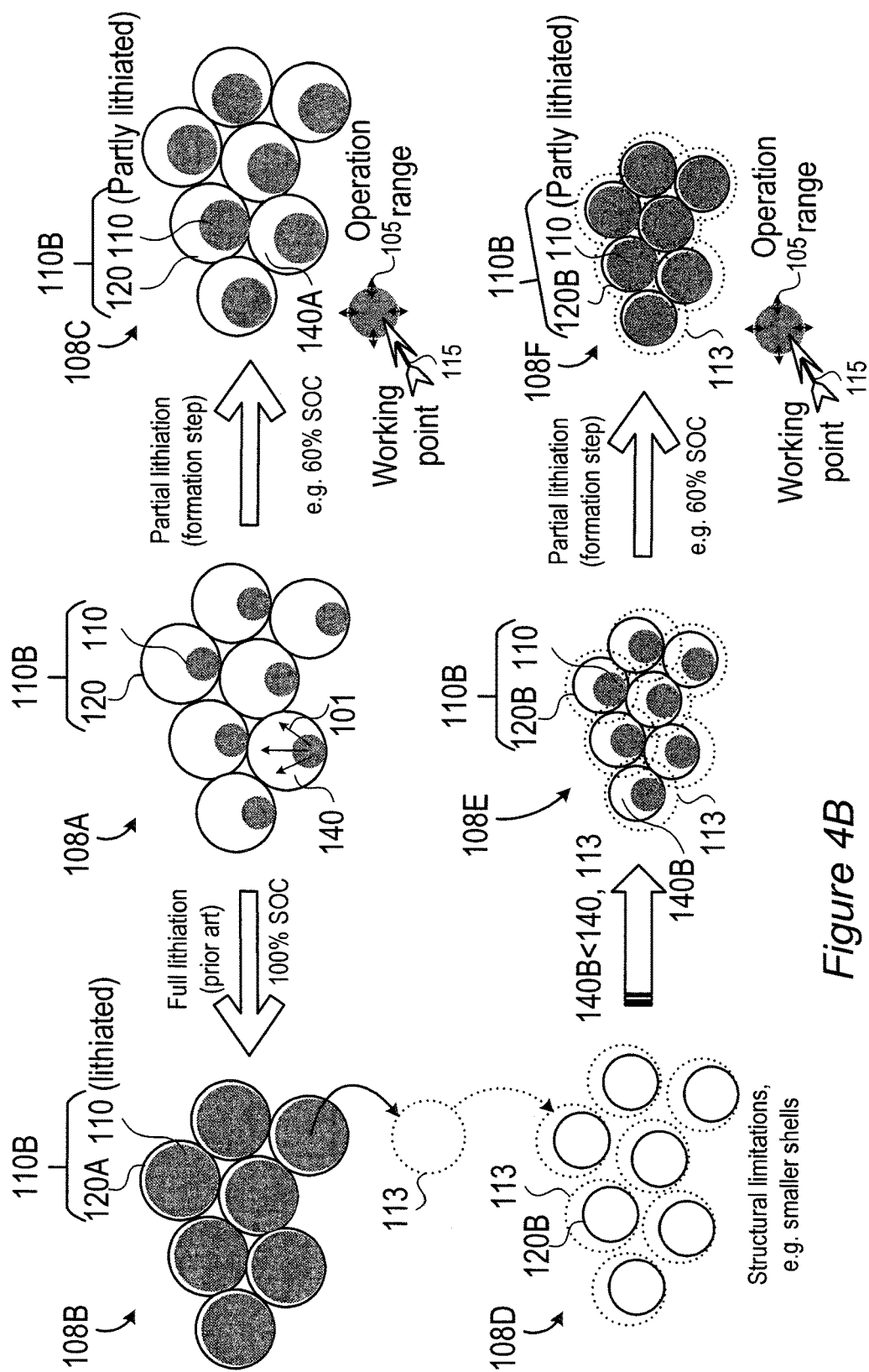
FIG. 4B is a high level schematic illustration of partial lithiation and mechanical barriers for lithiation of the anode material particles, according to some embodiments of the invention.

FIG. 4B is a high level schematic illustration of partial lithiation and mechanical barriers for lithiation of the anode material particles, according to some embodiments of the invention. Fast-charging lithium ion battery 100A may have e.g., Si, Ge and/or Sn-based anode active material and be designed to operate at 5 C at least and within operation range 105 of 5% at most around working point 115 of between 60-80% lithiation of the Si, Ge and/or Sn-based anode active material. FIG. 4B illustrates schematically a small section 108A of anode 108 with composite particles 110B, which are depicted in a noon-limiting manner as "yolk and shell" particles comprising anode material particles 110 as cores ("yolks") internally attached to coating(s) 120 ("shells") and having gap 140 for expansion 101 due to lithiation during formation and charging.

In prior art use of lithium ion batteries, illustrated schematically by small section 108B, anode material particles 110 are being fully lithiated during formation and charging in operation (e.g., 100% SOC, 95% or 99% SOC, certain voltage level or minimal voltage change indication full lithiation etc. as various used indicators of full charging). Shells 120A are correspondingly configured (e.g., in a formation process step) to provide gap 140 sufficient to accommodate the full expansion under lithiation of anode material particles 110.

In contrast, some embodiments may implement partial lithiation to obtain working point 115 illustrated schematically by small section 108C. For example, a formation process may be applied to configure composite particles 110B to have partly lithiated anode material particles 110 (e.g., with working point 115 being any of 20%, 40%, 60%, 80% or intermediate lithiation states, e.g., in terms of SOC). Operation of battery 100A may then be carried out only within operation range 105 around working point 115, e.g., ±1% SOC (alternatively, as disclosed herein, ±2%, ±0.5%, ±5%, ±0.1%, ±10% or intermediate operation ranges 105 as non-limiting examples). A remaining gap 140A may be configured to serve various purposes such as any of (i) enhancing ionic and/or electronic conductivity to cores 110 by an appropriate filling material, (ii) maintaining contact of cores 110 with shells 120 (e.g., by elastic filling material that is compressed during formation), (iii) supporting the mechanical stability of anode 108 and/or the contact among composite particles 110B and so forth.

Alternatively or complementarily, some or all of composite particles 110B may be configured with smaller gaps 140B to form mechanical barriers (structural limitations) on the possible expansion 101 of cores 110. As illustrated schematically in section 108D, full lithiation of cores 110 may yield an expansion volume 113 (e.g., typically up to 300% in Si as anode material); shells 120B may be configured (e.g., as in a given structure and/or in a formation step designed for this purpose) to be smaller than maximum-lithiation expansion volume 113 (e.g., any of 20%, 40%, 60%, 80% thereof, or any intermediate value, in terms of volume). As illustrated schematically by small section 108E, composite particles 110B may comprise anode material particles 110 in shells 120B which have a smaller volume than shells 120, prohibiting full lithiation of cores 110. Accordingly, gaps 140B in non-lithiated state of cores 110 may be smaller than prior art gaps 140 designed to accommodate full lithiation.

Shells 120B may be configured according to working point 115 and operation range 105, to accommodate just the maximal partial lithiation to which anode 108 and battery 100A are designed, as illustrated schematically by small section 108F.

It is emphasized that gaps 140, 140A, 140B may be implemented by an elastic or plastic filling material in shells 120 and/or implemented by the flexibility of coating(s) 120 (coating 120 may be configured to extend as anode active material particles 110 expand, to provide room for expansion 101).

While contrary to prior art configuration, and counterintuitive in the sense that the potential capacity of the anode material is being severely limited already in the design of battery 100A, the inventors have found that for the supercapacitor emulation applications disclosed herein, designs such as illustrated in section 108F with shells 120B smaller than maximum-lithiation expansion volume 113 of anode material particles 110 are advantageous in the sense that they enable more efficient use of space (by avoiding gaps 140A) and result in higher volumetric capacity and higher instantaneous current inputs and outputs which are important in supercapacitor emulating batteries 100A and devices 100, as disclosed herein.

FIGS. 5A-5C are high level schematic illustrations relating to the selection of working point 115 and narrow operation range 105, according to some embodiments of the invention. FIGS. 5A, 5B illustrate schematically charging and discharging graphs, respectively and FIG. 5C illustrates an example for an optimal working window for selecting working point 115, and illustrates an example for considerations for selecting working point 115.

As illustrated schematically in FIGS. 5A-5C, around working point 115 and narrow partial operation range 105 may be determined (230) at different locations on either of charging and discharging curves (FIGS. 5A and 5B, respectively) according to various considerations. Moreover, modified battery 100A may be re-configured with respect to the determined working point 115 and narrow partial operation range 105 to improve the performance of device 100 even further. In such case, modified battery 100A may no longer be capable of exhibiting full charging and discharging ranges as the unmodified lithium ion battery, yet still may be operated within narrow range 105 of its potential capacity. For example, anode material particles 110 may be made of Si which expands by up to 300% upon lithiation, yet modified battery 100A may be operated by control unit 106 only in narrow range 105 which results in a much narrower range of physical expansion upon lithiation, e.g., of 10% or 20%. As a result, modified battery 100A may be designed to provide less means for coping with expansion 101 of anode material particles 110 and as a consequence may be designed to have a larger volumetric capacity than a regular lithium ion battery configured to operate over the full charging and discharging range.

FIG. 5C illustrates an example for an optimal working window for selecting working point 115, and non-limiting selection considerations, according to some embodiments of the invention. The graph illustrates, in a non-limited manner, an example for the normalized anode DC (direct current) resistance performance as function of the state of charge (SOC), and provides the optimal working range for modified battery 100A as the SOC range with low resistance, in which working point 115 and operation range 105 may be selected (indicated schematically by sets of an ornate arrow indicating working point 115 and a double-headed arrow indicating the operation range 105).

FIG. 5C further illustrates schematically anode material particles having anode material cores 110 and coating 120 at two ends of the optimal working window, namely at lower and higher lithiation states at the left-hand and right-hand sides thereof (with $Li^{-0'}$ indicating the higher lithiation state). Expansion 101 is indicated schematically, in an exaggerated manner, for narrow operation range 105 in each case. In the lower lithiation state (e.g., 20-30% lithiation) the volume change of anode material particle 110 with respect to the size of anode material particle 110 (its relative expansion) is larger than the volume change of anode material particle 110 with respect to the size of anode material particle 110 (its relative expansion) in the higher lithiation state (e.g., 70-80% lithiation), because anode material particle 110 themselves are larger due to the higher level of lithiation. This effect may be significant in metalloid-based anode material such as Si, Ge and Sn, which expand by 100-500% or more upon lithiation (e.g., Si 400%, Ge 270% and Sn 330%). In certain embodiments, working point 115 may be selected at a lithiated state of the anode material in which the anode material particles are expanded, so that the additional expansion due to further charging is relatively small. In certain embodiments, anode material lithiation at working point 115 may be e.g., 50-80%, such as at 50%, 60%, 70%, 80% lithiation or at similar values. The inventors have discovered that as modified battery 100A is operated only over operation range 105, its design may be optimized for its specific operation specifications.

In certain embodiments, anode modifications 260 may comprise enhancing ionic and/or electronic transport kinetics and conductivity, e.g., by various elements disclosed in FIG. 4A such as ionic-conducting coatings and conductive additives. In addition to the amount of active material discussed above, also anode parameters such as thickness and porosity may be modified to increase the capacity and the conductivity (and thereby the C rate) and enhance the operation of modified battery 100A within operation range 105 around working point 115. In certain embodiments, cathode 87 and/or electrolyte 85 may also be modified to enhance operation of modified battery 100A within operation range 105 around working point 115.

In certain embodiments, as operation range 105 is restricted with respect to lithium ion batteries which are used over the whole operation range, battery 100A may be configured to have smaller cathode(s) 87, e.g., thinner cathode(s) 87, cathode(s) 87 with a smaller area, etc., having a smaller capacity than anode(s) 108. In certain embodiments, cathode(s) 87 may have a charge capacity that is smaller than the charge capacity of anode(s) 108 by e.g., 10%, 20%, 30% or even 40%. For example, cathode(s) 87 may have a capacity of 90%, 80%, 70%, 60%, respectively, of the capacity of anode(s) 108. These differences may be with respect to pristine cathodes and anodes, and/or with respect to cathodes and anodes in operation. It is noted that as some of the cathode lithium is absorbed in the solid electrolyte interface (SEI) during the formation process, a required operational cathode-anode load ratio may be implemented as a larger cathode-anode load ratio of the pristine electrodes. As operation range 105 is set to be smaller, the cathode-anode load ratio may also be smaller, requiring smaller cathodes.

Advantageously, disclosed fast-charging battery 100A and/or devices 100 do not only emulate supercapacitors to provide comparable or better performance, but are also superior to equivalent supercapacitors in having lower self-discharge rates, higher working potentials, shorter charging times and higher energy densities than comparable supercapacitors.

For example, fast-charging batteries 100A typically provide an average output voltage level above 3V (e.g., 3.35V averaged from 4.3V to 2V) while supercapacitors are typically specified at 2.7V output voltage or even less, which moreover decays with self-discharge of the supercapacitor. Fast-charging batteries 100A and/or devices 100 therefore provide a wider usable voltage range that broadens the operating margin for designers using them, with respect to using equivalent supercapacitors.

Moreover, operating fast-charging batteries 100A and/or devices 100 may be configured to provide a very stable output voltage which is beneficial in many product designs. Not only that fast-charging batteries 100A provide most of their energy capacity at a stable voltage level (e.g., 3.35V), but they regulated operation within narrow operation range 105 around working point 115 enhances the constancy of the output (and/or input) operation voltage significantly. The very stable output voltage delivered by disclosed fast-charging batteries 100A and/or devices 100 stands in stark contrast to equivalent supercapacitors which typically produce an output voltage that is linearly proportional to their charge (e.g., a supercapacitor fully charged to 3.3V delivers 3.3V at 100% charge but only 1.65V at 50% charge, which is below the level required by many processors and other devices).

It is also noted that the low levels of self-discharge of fast-charging batteries 100A and/or devices 100 with respect to equivalent supercapacitors is advantageous in avoiding the over-design of power sources in systems using supercapacitors, required to compensate for supercapacitors' high losses. For example, in certain embodiments, fast-charging batteries 100A and/or devices 100 may be configured to operate at a voltage level of at least 3V, and have a leakage current smaller than 0.1% of a respective maximal continuous current.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A device comprising control circuitry and a modified fast-charging lithium ion battery having Si, Ge and/or Sn-based anode active material and designed to operate at 5C at least and within an operation range of 5% at most around a working point of between 60-80% lithiation of the Si, Ge and/or Sn-based anode active material, wherein the control circuitry is configured to maintain a state of charge (SOC) of the battery within the operation range around the working point, wherein the anode active material is configured to enable operation of the modified fast-charging lithium ion battery only around the working point and within the operation range, wherein an anode of the modified fast-charging lithium ion battery comprises mechanical barriers configured to prevent full expansion of the anode material upon lithiation and wherein the anode material comprises composite anode material particles having shell structures which are smaller than a full expansion volume of cores of the composite anode material particles.

2. The device of claim 1, wherein the mechanical barriers are configured to enable 80% or less of the full expansion of the anode material upon lithiation.

3. The device of claim 1, wherein a cathode of the modified fast-charging lithium ion battery has a capacity of 80% or less than the anode.

4. The device of claim 1, configured to operate at a voltage level of at least 3V, and have a leakage current smaller than 0.1% of a respective maximal continuous current.

5. A fast-charging lithium ion battery having Si, Ge and/or Sn-based anode active material and operating at least at 5 C charging rate, only within an operation range of 5% at most around a working point of between 60-80% lithiation of the Si, Ge and/or Sn-based anode active material, wherein the battery is modified to enable operation thereof only around the working point and within the operation range, wherein an anode of the battery comprises mechanical barriers configured to prevent full expansion of the anode material upon lithiation, wherein the mechanical barriers are configured to enable 80% or less of the full expansion of the anode material upon lithiation, and wherein the anode material comprises composite anode material particles having shell structures which are smaller than a full expansion volume of cores of the composite anode material particles.

6. The fast-charging lithium ion battery of claim 5, wherein a cathode thereof has a capacity of 80% or less than an anode thereof.

* * * * *